United States Patent [19]
Blase et al.

[11] Patent Number: 5,058,415
[45] Date of Patent: Oct. 22, 1991

[54] ROLLING BEARING SEAL RING CRIMP TOOLING

[76] Inventors: John G. Blase, 4 Pond View Rd., Monroe, Conn. 06468; Robert Blase, 1009 Round Hill Rd., Fairfield, Conn. 06430

[21] Appl. No.: 542,713

[22] Filed: Jun. 25, 1990

[51] Int. Cl.⁵ .............................................. B21J 7/16
[52] U.S. Cl. ...................................... 72/400; 29/237; 29/725
[58] Field of Search ...................... 72/345, 352, 353.2, 72/399, 400; 29/725, 237

[56] References Cited

U.S. PATENT DOCUMENTS

| | | | |
|---|---|---|---|
| 3,537,291 | 11/1970 | Hawkins | 72/352 X |
| 3,750,452 | 8/1973 | Frank | 29/237 X |
| 4,034,593 | 7/1977 | Patel | 72/402 |
| 4,468,827 | 9/1984 | Shachaf | 72/353.2 X |
| 4,953,383 | 9/1990 | Stiver | 29/237 X |

Primary Examiner—Timothy V. Eley
Assistant Examiner—C. Richard Martin
Attorney, Agent, or Firm—Mattern, Ware, Stoltz & Fressola

[57] ABSTRACT

A stamping press tool assembly for delivering parallel forces to a plurality of points angularly spaced around a ring-shaped workpiece, whereby the ring-shaped workpiece is positioned beneath a shouldered hub centered inside the tool assembly, and having a plurality of radial sector rams arrayed between the hub and a bottom plate. The hub receives independent and substantially equal force, providing custom stamping deformation of the workpiece in a uniform manner.

8 Claims, 8 Drawing Sheets

ROLLING BEARING SEAL RING CRIMP TOOLING

This invention relates to radially segmented tooling for stamping press use in the crimping of bearing sealing rings inside their mounting grooves in rolling bearing races. More specifically, the invention relates to independently actuated sector rams positioned to deliver substantially equal crimping forces at a multiplicity of peripheral points around the rim of the ring seal of a rolling bearing.

BACKGROUND OF THE INVENTION

Bearing manufacturers customarily enclose and seal the moving balls or rollers and cages between the outer and inner races of rolling bearings, using flat ring-shaped or washer-shaped seals or shields to enclose the moving parts. The outer rims of these seals or shields are customarily flanged axially outward, and the flange is spread radially in a crimping operation into a concave groove formed in the outer portal rim of the outer race on both sides of the rolling members.

The inner rim of the seal or shield closely adjoins the inner race, and for heavy duty applications with farm machinery, utility vehicles and military equipment which may encounter dirt, dust and sand, the inner rim of the seal may be formed of one or more rings of rubber sheet or molded rubber material bearing against the inner race and designed to keep lubricants inside the bearing assembly, and dirt outside.

During bearing manufacture, heat treatment exposes the outer bearing race to high temperatures which often distort the roundness of the bearing race from its original machining, and the nominal dimensions can be subject to wide tolerances, as much as 0.005 to 0.015 inches. Following heat treatment, the groove to receive the rolling members in the outer cylindrical rim, as well as the end wall rims of the outer race are all ground to exact tolerances, and are perfectly round, to be seated in bearing seats or sleeves and to receive the rolling members in exact circular orbit.

Heat treatment distortion of the outer bearing race may however leave the convex seal groove in the portal end of the outer bearing race distorted and out of round. As a result, when the flanged ring seals are placed in position and their outer rim flanges are spread radially outwardly during the crimping operation, they may engage the outer race only at two smallest-diameter points. The ring seals may provide very poor contact or lack of engagement at other points where the effective diameter of the distorted convex seal groove is larger. The outer bearing race is often thrown out of round beyond allowable tolerances by seal-crimping stress applied at only two points by the crimped ring seal. In addition, the ring seal may not reach the groove except at these two points, and this permits lubricant to escape and dirt, dust or foreign objects to enter the bearing, making the seal inadequate.

The crimp tooling of the present invention solves these problems by applying independent crimping forces at a plurality of points around the periphery of the ring seal. These independent crimp forces are substantially equal by reason of the symmetrical geometry of the crimp tooling, and dimensional variations in the seal groove receiving the crimped seal merely allow different portions of the seal rim to be crimped independently to match any such dimensional variations. Crimping deformation is thus uniformly distributed about the periphery of the ring seal and stress concentrations at only a few minimum diameter points are substantially eliminated, making the sealing operation more uniformly effective and avoiding any crimping distortion of the bearing assembly itself.

In the crimp tooling of the present invention, the independent crimping forces are applied by a plurality of sector rams peripherally arrayed around the rim of sealing rings presented at the work station for crimping. Each sector ram is actuated by independent crimping force supplied by an independent hydraulic piston-cylinder unit, whose force may be transmitted to the sector ram by a radial lever in the tooling assemblies of the preferred forms of the invention.

Accordingly, a principal object of the present invention is to provide crimping tooling for seal rings for rolling bearings which minimizers or eliminates distortion of the outer races resulting from the crimping operation.

A further object of the invention is to provide such crimping tooling methods and devices which produce highly efficient crimping installation of ring seals in rolling bearing races while significantly improving the sealing operation thereof.

Still another object of the present invention is to provide such ring seal crimping methods and apparatus which are well adapted for incorporation in automatic production line equipment for rolling bearing manufacture.

A further object of the invention is to provide rolling bearing seal crimping methods and devices which are adapted for incorporation in production line equipment in which both ends of each rolling bearing are successively sealed and crimped as they progress along the automatic or semi-automatic production line.

Other objects of the invention will in part be obvious and will in part appear hereinafter.

The invention accordingly comprises the several steps and the relation of one or more of such steps with respect to each of the others thereof, and the features of construction, combinations of elements, and arrangements of parts which will be exemplified as hereinafter set forth, and the scope of the invention will be indicated in the claims.

For a fuller understanding of the nature and objects of the invention, reference should be made to the following detailed description taken in connection with the accompanying drawings, in which:

THE DRAWINGS

FIGS. 9 and 10 are corresponding cross-sectional side elevation views of the lower portions of the crimping die assemblies of the present invention, FIG. 9 showing a crimping die assembly for a small diameter rolling bearing while

BEST MODE FOR CARRYING OUT THE INVENTION

Figure 1:
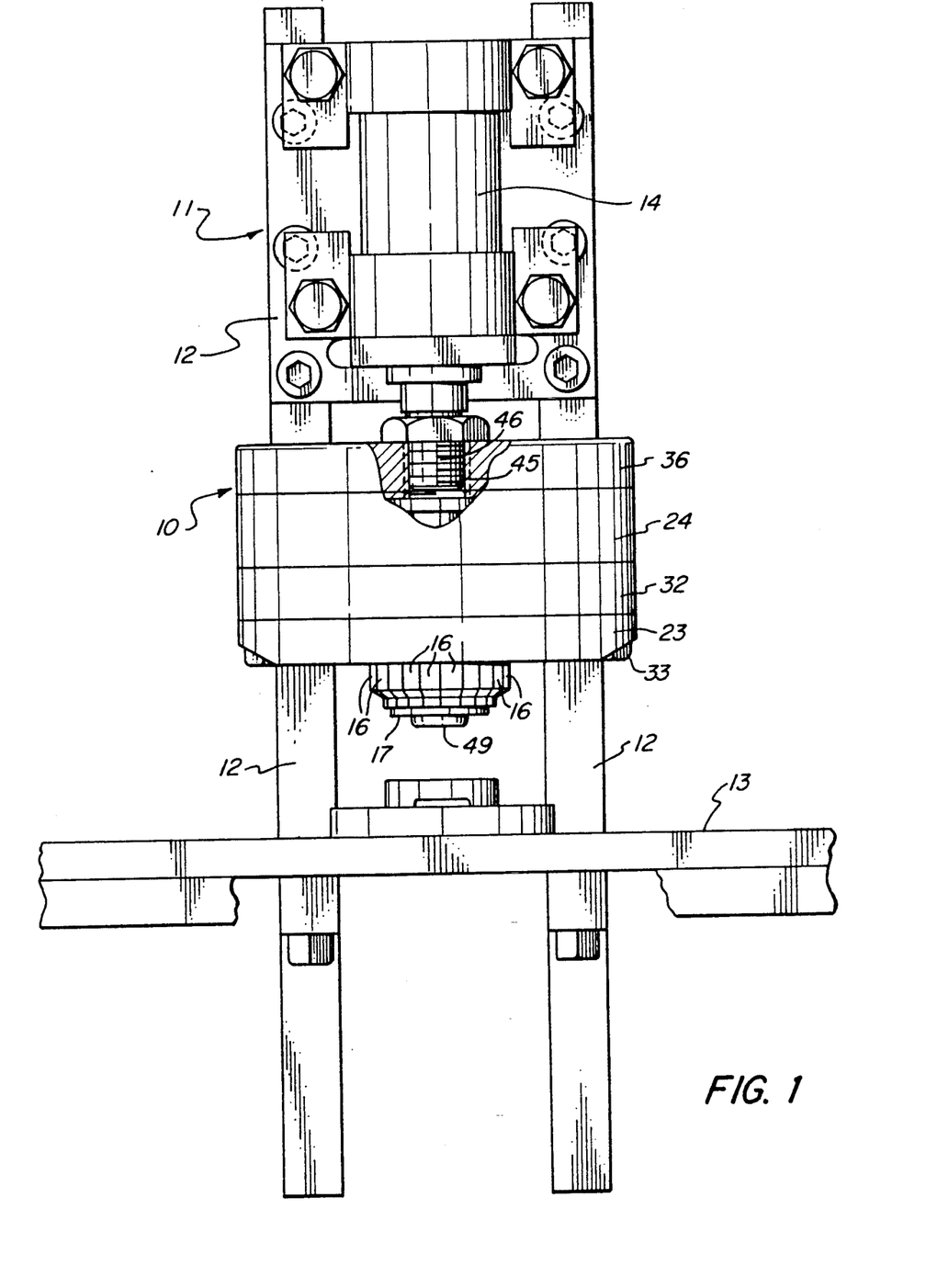
FIG. 1 is a fragmentary front elevation view, partially broken away, of a stamping press in which is mounted rolling bearing seal crimping tooling incorporating the characteristic features of the present invention.
Figure 2:
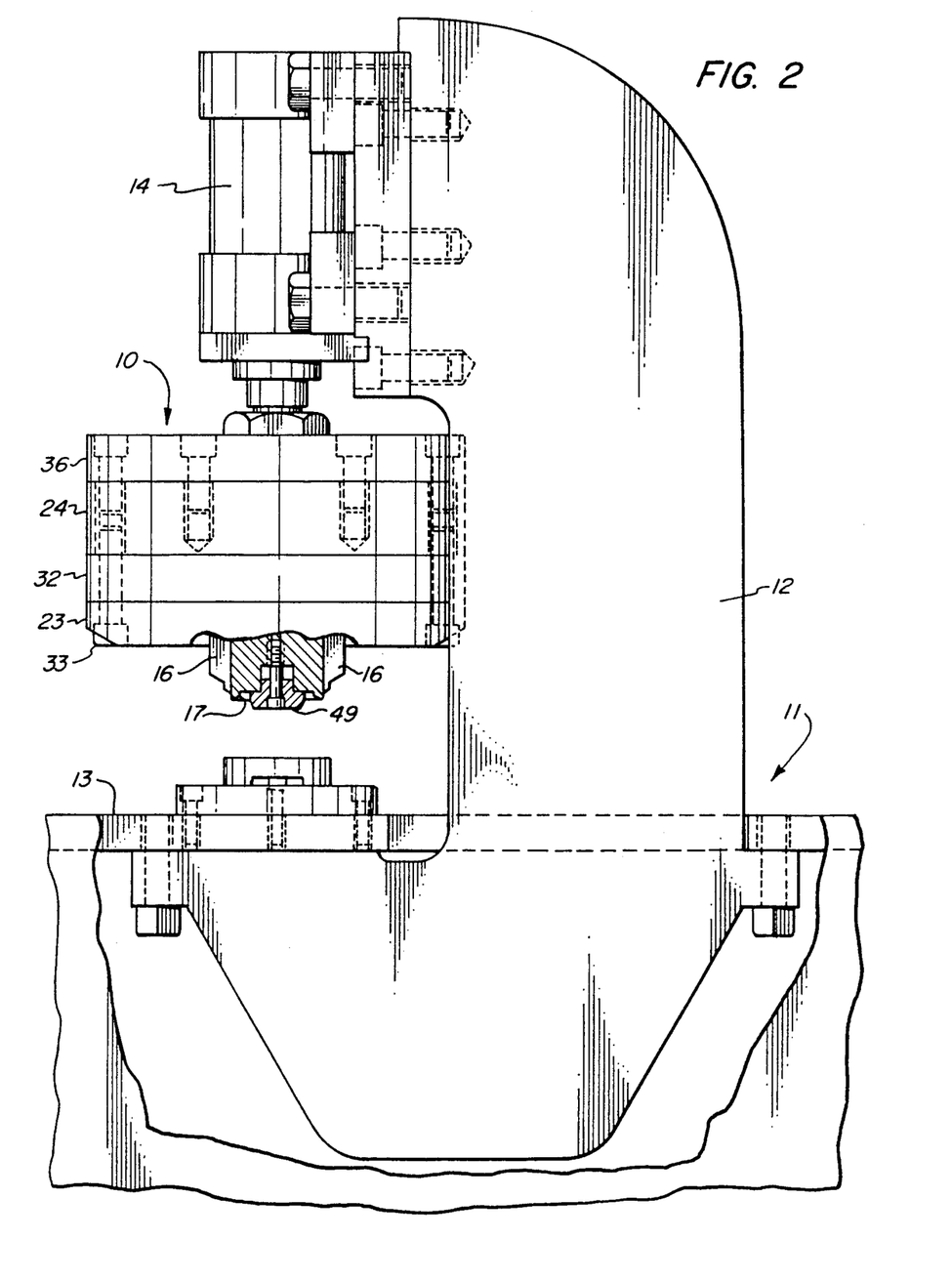
FIG. 2 is a side elevation view of the stamping press of FIG. 1, partially broken away in cross section to show the sector ram portion of the crimping tooling of the present invention.

The crimp tooling assembly characterizing the present invention is identified by the numeral 10 in the figures. In FIGS. 1 and 2, tooling assembly 10 is shown mounted on a stamping press 11 having an upstanding column 12 extending upward above table 13 and supporting a hydraulic power cylinder 14 whose piston is the support for the crimp tooling assembly 10. The crimp tooling assembly 10 shown in FIGS. 1 and 2 is shown in more detail in the cross-sectional front elevation view of FIG. 3 and the cutaway bottom view of FIG. 4. In these figures the cooperating moving parts of the crimp tooling assembly 10 are seen in their cooperating relationships.

A plurality of vertically movable sector rams 16 are arrayed circumferentially around the exterior of a central hub 17. Sixteen of these sector rams 16 are shown in the figures and their concentric positioning is assured by a corresponding plurality of dowel guide pins 18 positioned in accurately bored holes extending vertically through the assembled ring of sector rams 16. Each guide pin 18 is positioned intersecting a dividing plane between two adjacent rams 16.

The resulting guide pin holes are thus formed by a pair of semi-cylindrical vertical grooves 50 concavely positioned in each sidewall of each sector ram 16. These concave semibores 50 face each other as the sector rams 16 are arrayed in the ring encircling hub 17. A radial flange 19 of each sector ram 16 extends outward over a peripheral shoulder 21 formed around the upper inside periphery of a central bore 22 formed in the bottom plate 23 of the crimped tool assembly 10.

Bottom plate 23 is joined by an overlying chamber ring 32 to an overlying central cylinder block 24 in which there are bored a corresponding plurality of hydraulic cylinders 26, each accommodating a vertically sliding piston 27. Each of the pistons 27 is centered in a radial plane which bisects one of the sector rams 16. The lower end of each piston 27 bears against a crowned central portion of a radially extending lever 28, and each of the levers 28 has an inner end resting on the upper surface of flange 19 of one of the sector rams 16 as well as an outer end resting at the outer periphery of an upward facing surface of the bottom plate 23.

Levers 28 have their outer ends 29 slidably positioned between radially inwardly extending guide sector protrusions 31 formed inside the chamber ring 32 clamped by lower screws 33 between bottom plate 23 and cylinder block 24.

Figure 3:
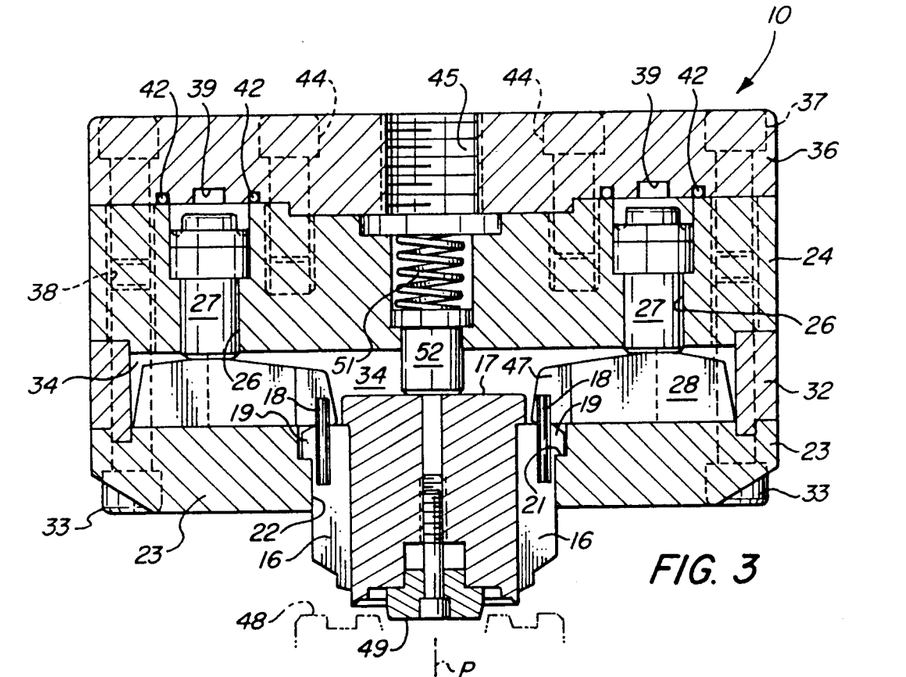
FIG. 3 is an enlarged cross-sectional front elevation view showing the moving parts of the sector ram portion of the tooling characterizing the present invention.
Figure 4:
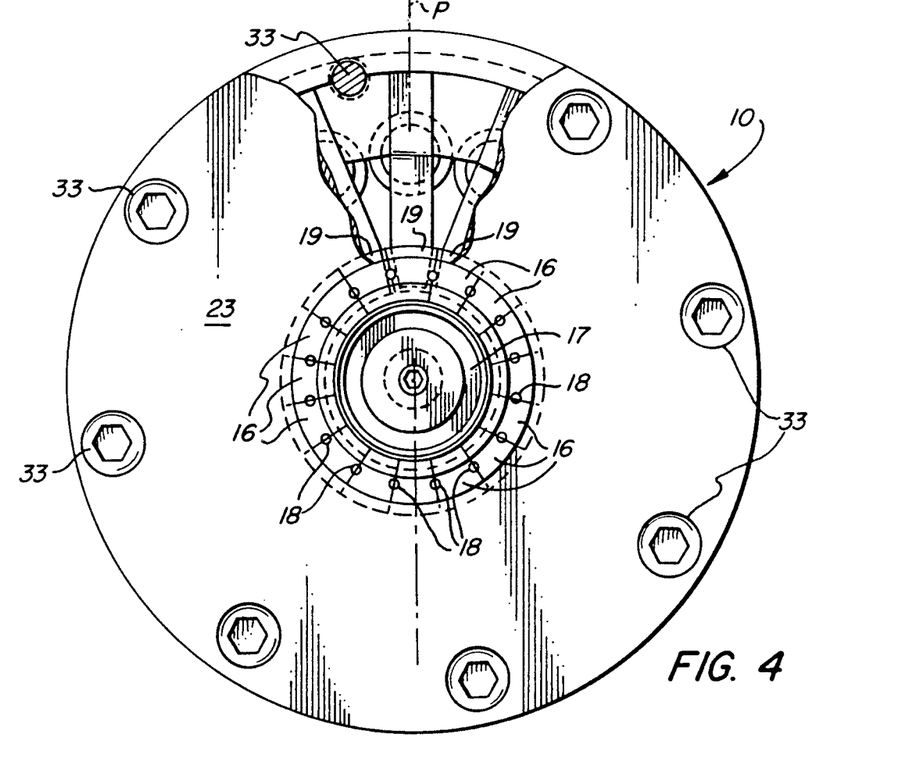
FIG. 4 is a bottom plan view of the assembled tooling shown in FIG. 3 showing sixteen sector rams arrayed peripherally around the central portion thereof, and partially broken away to illustrate actuating levers and hydraulic pistons incorporated in the tooling mechanism.
Figure 9:
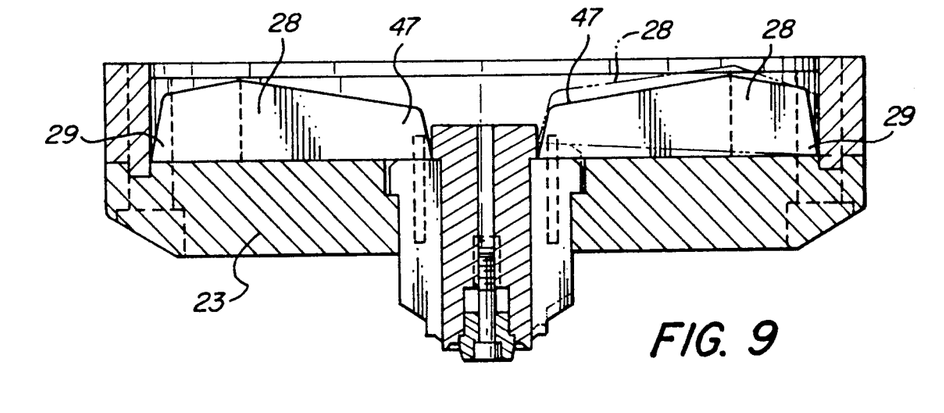

As shown in FIG. 3, these members, plate 23, chamber ring 32 and cylinder block 24 enclose a lever chamber 34 within which levers 28 are confined for limited pivoting movement, from the dashed line upper, retracted position shown in FIG. 9 to the extended, crimping position shown in the FIGURES in solid lines.

Pistons 27 are correspondingly free for limited reciprocal sliding movement in their bored cylinders 26, with their upward movement being limited by overlying cylinder head 36 clamped by upper screws 37 to the upper face of cylinder block 24.

As shown in FIG. 3, threaded bores 38 around the outer periphery of cylinder block 24 receive both upper screws 37 and lower screws 33, anchoring the component parts of the crimping assembly 10 together.

A ring shaped groove 39 formed in the underside of cylinder head 36 forms a pressure manifold delivering hydraulic fluid under pressure to cylinders 26. Groove 39 is flanked by two sealing grooves 41 in which resilient sealing O-rings 42 are installed during assembly, compressed between cylinder block 24 and cylinder head 36.

Figure 5:
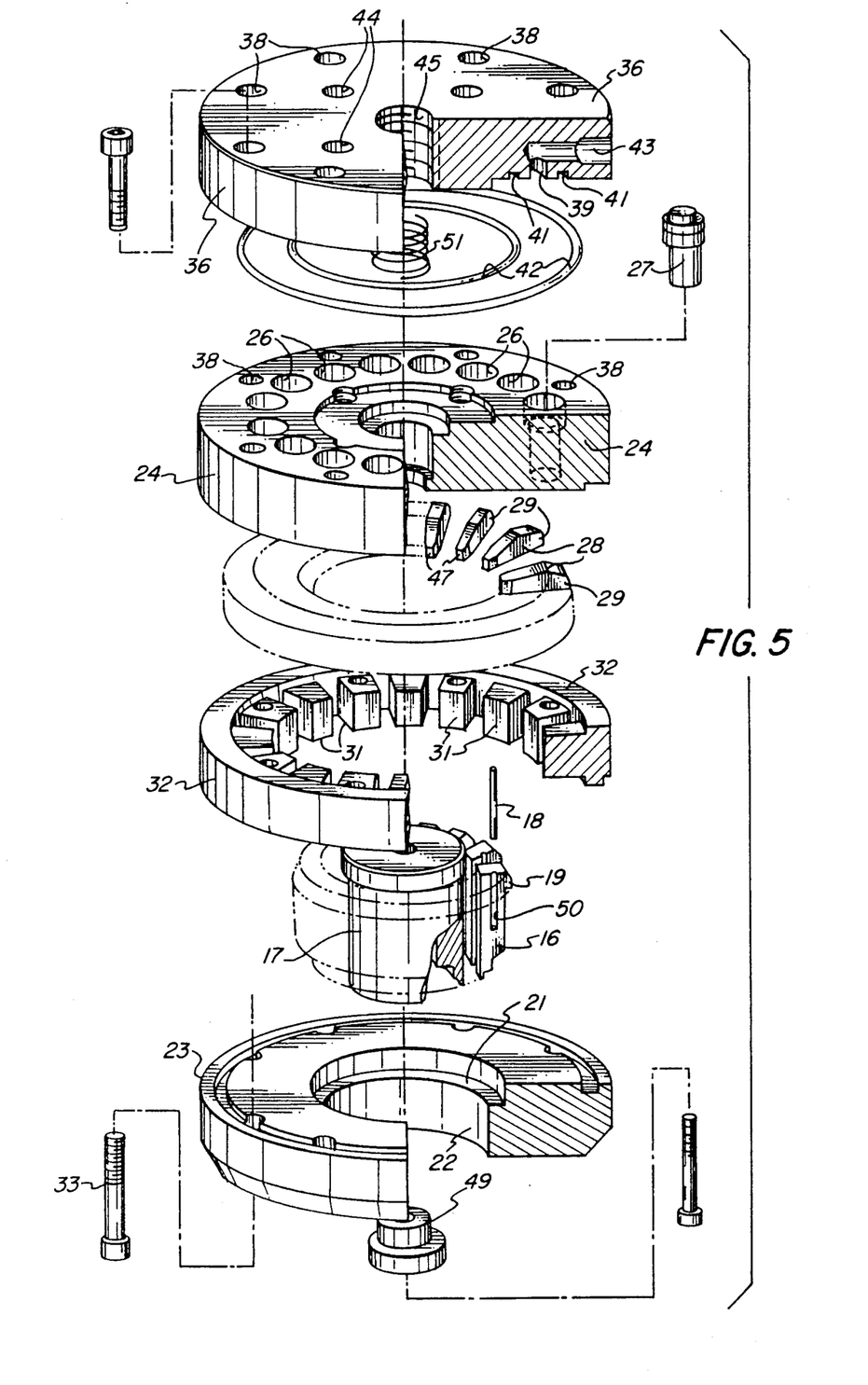
FIG. 5 is an exploded perspective front elevation view of the crimp tooling assembly shown in FIGS. 3 and 4, with its various portions cut away over approximately a 90 degree sector to illustrate the assembly and the cooperating relationships of the component parts of the assembly.

A pressure inlet port 43 shown in FIG. 5 connects with manifold groove 39, and an inner ring of head screws 44 extending through bores in head 36 into threaded blind holes in block 24 cooperate with the outer ring of upper screws 37 to clamp head 36 to block 24.

A central threaded mounting bore 45 in head 36 accommodates the threaded lower end of stamping press piston 46, securing crimping assembly 10 to the press ram for crimping operation (FIG. 1).

The inner ends 47 of levers 28, angularly spaced by sector protrusions 31, bear on upper flanges 19 of sector rams 16. Between each adjacent pair of levers 28 and sector rams 16 is a guide pin 18 riding in facing concave guide recesses 50 in the radial faces of rams 16, as shown in FIGS. 4, 5, 9 and 10.

The sector rams 16 reciprocate vertically through a short stroke, whose length is determined by the slight angular pivoting movement of levers 28, all pivoting about their outer ends 29 resting on the upper face of bottom plate 23, between the upper retracted position shown in dashed lines in FIG. 9, and the extended, crimping position shown in the FIGURES.

In the retracted position, inner ends 47 of levers 28 are forced upward by the sector rams 16 as the crimping assembly 10 is lowered into position contacting the ring seal to be crimped. The rolling bearing 48 shown in FIG. 10 and in dash lines in FIG. 3 receives the central pilot 49 underlying hub 17, centering inside the inner race of the bearing 48, and downward movement of assembly 10 lowers hub 17 as a pilot on the ring seal itself. Further descent of assembly 10 raises hub 17 and then sector rams 16 relative to assembly 10, pivoting levers 28 upward about their outer ends 29, driving pistons 27 upward within cylinders 26 in cylinder head 24, and compressing an ejector spring 51 positioned between stamping press piston 46 and a shouldered stripping ejector core 52 slidably mounted for reciprocating vertical movement in a central bore 53 in cylinder block 24, and depending downward therefrom into abutting engagement with hub 17 inside lever chamber 34.

CRIMPING OPERATION

When the rolling bearing with its ring seal mounted ready for crimping is thus positioned in the crimp tooling of the present invention, the sector rams are raised with their radial flanges 19 above shoulder 21 in the bore 22 of bottom plate 23, and the inner ends 47 of levers 28 are all in their upper dash line positions within chamber 34, as shown in FIG. 9.

As the crimping operation begins, pressurized hydraulic fluid is admitted through port 43 and manifold groove 39 into the upper ends of all of the cylinders 26 in cylinder block 24. The pressurized fluid drives all of the pistons 27 downward, pivoting the raised levers 28 about their outer ends 29. The downward pivoting inner ends 47 of all of the levers 28 drive all of the sector rams 16 downward, from the retracted positions shown in FIGS. 6, 7 or 8 to the crimped positions shown in FIGS. 6A, 7A or 8A.

Figure 6:
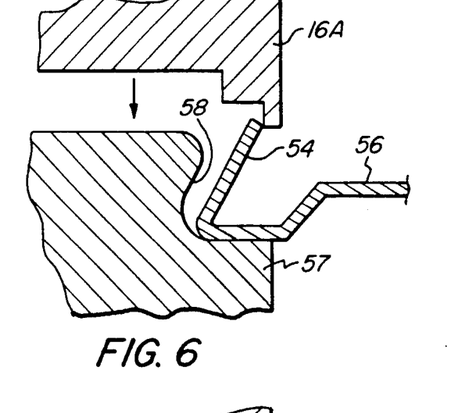
FIGS. 6, 7 and 8 are greatly enlarged fragmentary cross-sectional side elevation views showing the rim of three different seal rings positioned in their respective crimping grooves in the outer rolling bearing race ready for crimping, and exposed to the overlying crimping die.
Figure 6A:
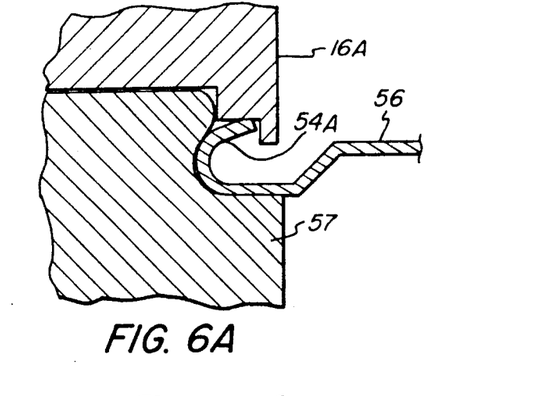
FIGS. 6A, 7A and 8A are corresponding views showing the same seal rings in their crimped position with the crimping die closed on the outer rolling bearing race and the crimped rim flange of the seal ring in each case.
Figure 7:
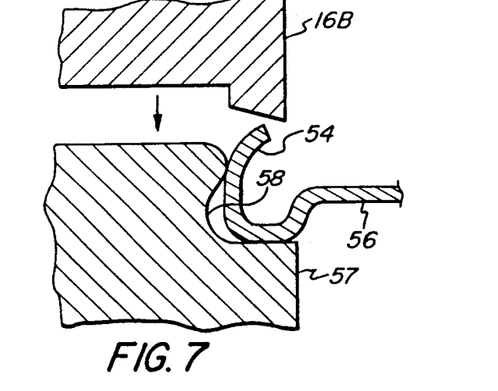
Figure 7A:
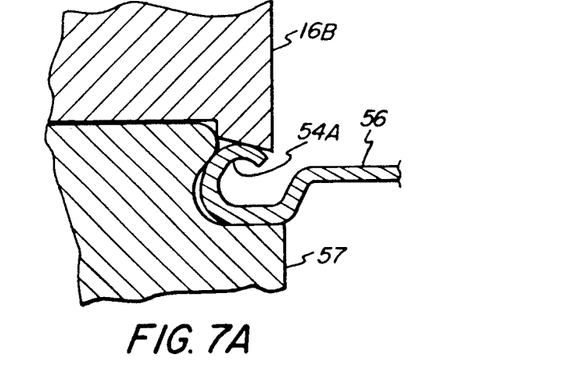
Figure 8:
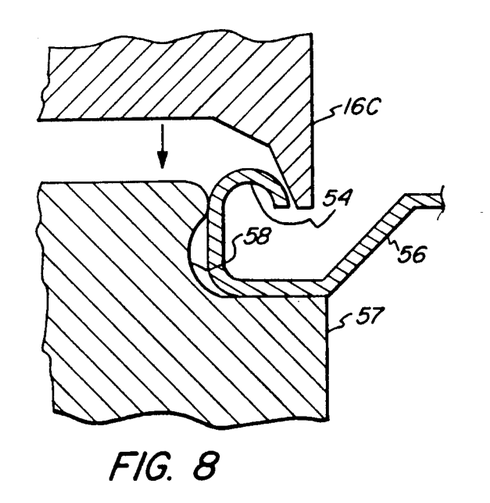
Figure 8A:
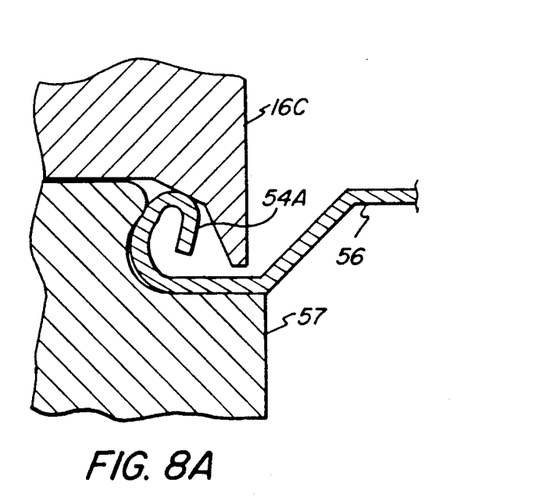
Figure 10:
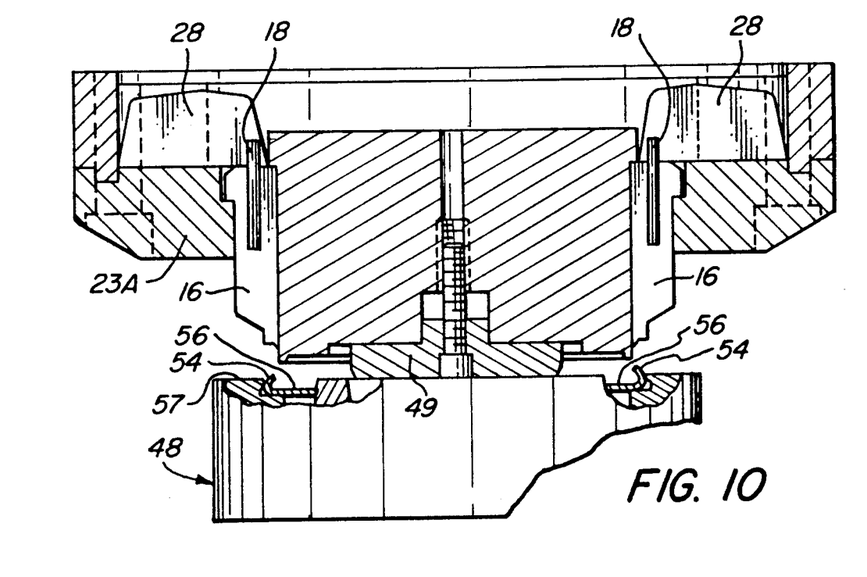
FIG. 10 shows a corresponding crimping die assembly for a large diameter rolling bearing.

As these FIGS. 6, 7 and 8 show, the axially upstanding rim flange 54 of the bearing's annular ring seal 56 in its uncrimped condition protrudes upward toward the crimping die sector ram 16, and generally slants inward toward the axis 55 of the rolling bearing 48, as seen in FIG. 10.

As the pressurized hydraulic fluid in manifold groove 39 and cylinders 26 drives downward pistons 27, levers 28 and sector rams 16, the rim flange 54 of the seal ring 56 is deformed past its yield point between rams 16 and the outer race 57 of bearing 48, spreading radially into its sealing groove 58. The plurality of sector rams 16 each deliver substantially equal crimping force to their respective sectors of the rim flange 54, but the varying radius of the sealing groove 58 facing different sector rams 16 caused by heat treatment of outer race 57 will permit greater or lesser crimping deformation of rim flange 54 under the same force delivered by different sector rams 16.

As a result, rim flange 54 is successfully crimped into close engagement with groove 58 under each sector ram, and not merely at the minimum diameter points in groove 58 caused by residual heat treating deformation of race 57. By dividing the total crimping force into a plurality of crimping forces delivered independently by separate sector rams 16 arrayed around the entire periphery of ring seal 56, effective sealing is achieved, while overstressing and undesired deformation of the finish-ground bearing race 57 is successfully avoided.

In order to assure substantial uniformity of the sector rams 16 in each crimp tooling assembly 10, the entire set of rams 16 may be fabricated from a single ring shaped sleeve, machined and finished to the desired tolerances. The concave recesses 50 for guide pins 18 may then be axial blind holes drilled at equally spaced intervals around the finished sleeve, which may then be cut, along radial planes passing through the drilled holes, into the final sector rams 16, leaving the facing halves of each blind hole forming guide pin recesses 50 on the adjacent faces of rams 16.

AUTOMATED PRODUCTION STATIONS

Figure 11:
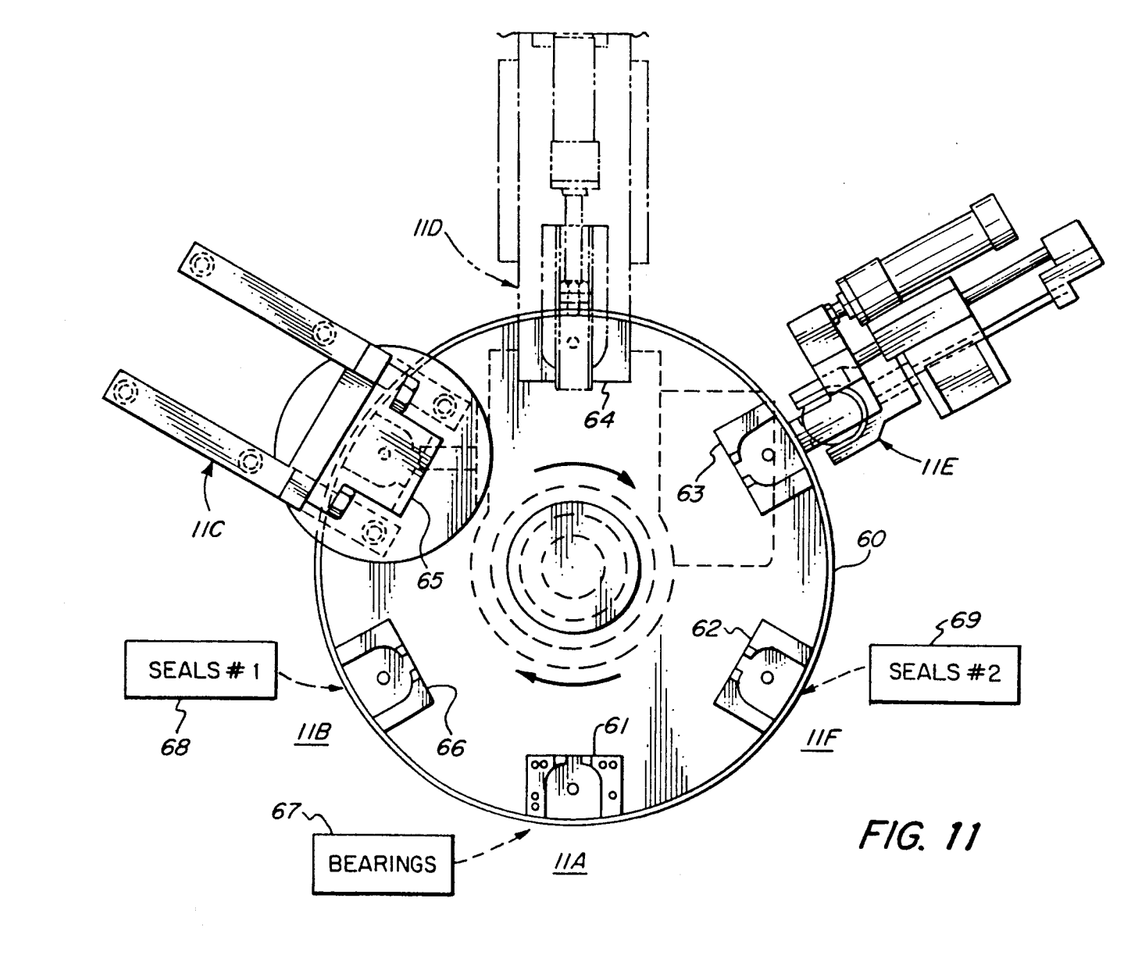
FIG. 11 is a schematic top plan view showing a production line work station incorporating a carousel-style worktable carrying workpieces from point to point, and three automated operating stations, a crimping station in the upper left portion of the drawing, an eject station at the top of the drawing and a turnover station at the upper right side of the drawing, with manual operator access to the revolving worktable being provided at the lower portion of the drawing.
Figure 12:
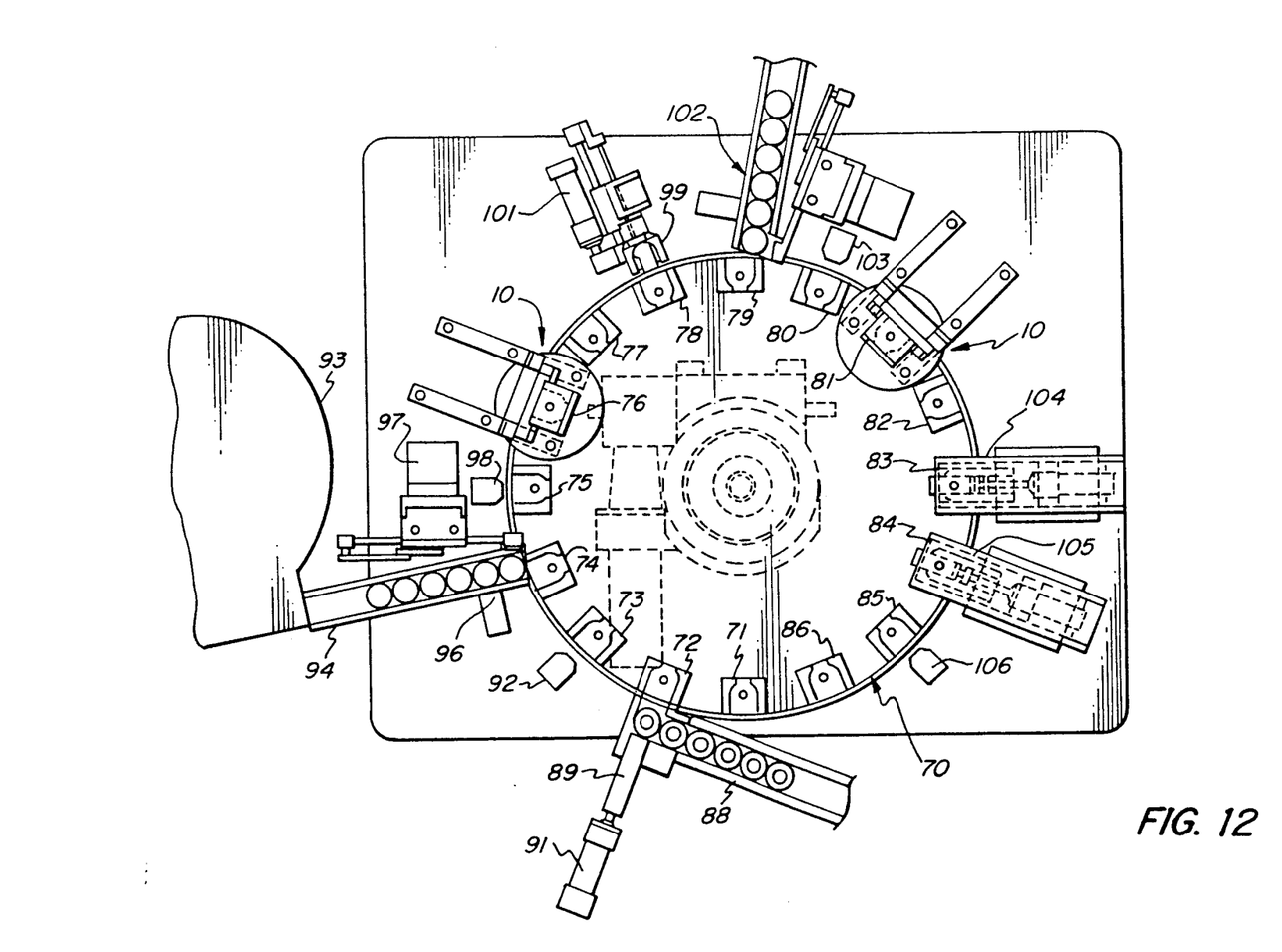
FIG. 12 is a similar schematic top plan view of a larger revolving carousel worktable incorporating two crimp stations, a bearing loader, a seal loader, a bearing turnover device and a second seal loader as well as one or more eject devices, thereby providing all automated work stations required to crimp seal rings on both ends of each rolling bearing during a single revolution of the underlying carousel worktable.

Two different forms of automated production stations are shown in FIGS. 11 and 12.

In FIG. 11 there is shown a semi-automatic production station with a carousel worktable indexed to revolve clockwise, carrying six work jigs or bearing-retaining nests at which production operations may be performed upon a workpiece, such as a rolling bearing which is to have ring seals crimped in place on both of its outer faces. Carousel worktable 60 is illustrated with its six work jigs 61–66 arrayed successively around its periphery in a counterclockwise direction.

Around the outside of worktable 60 are six fixed work stations where different operations are performed either manually or by automatic devices on workpieces held in work jigs 61–66 during two consecutive indexed revolution cycles of worktable 60. Work station 11A is the operator's location where fresh unsealed roller bearings are loaded successively in a predetermined work jig as it arrives at work station 11A directly in front of the operator. Alternate work jigs 61, 63 and 65 are loaded at station 11A, because intervening jigs 62, 64 and 66 carry inverted bearings through their second cycle of revolution around worktable 60.

Work station 11B presents a supply of ring seals identified as seals #1 to be inserted in place on each fresh bearing just loaded in the work jig now presented at station 11B. Station 11C comprises a crimping assembly incorporating the features of the present invention as already described, preferably mounted on a stamping press such as press 11 shown in FIGS. 1 and 2.

Work station 11D is an eject station where an eject mechanism grips and removes each of the completed roller bearings and delivers them to stock. Work station 11E is a turnover station where a bearing having its first seal ring crimped on one side is gripped, raised and transferred from an odd-numbered work jig 61, 63 or 65 into a turnover nest and rotated 180 degrees, i.e., inverted to expose the bearing face requiring the second seal. The same turnover station mechanism then reloads the inverted bearing with its open face upward in the next succeeding (even-numbered) work jig positioned before it at the next indexed position of worktable 60.

Work station 11F is a loading station for loading the second ring seal, designated ring seal #2 in FIG. 11, onto inverted bearings carried in even numbered work jigs. The loading of new bearings at work station 11A and the loading of seals #1 at station 11B and seals #2 at station 11F can all be accomplished manually, or if desired, automatic loading machinery may be used to make the operation of worktable 60 entirely automatic.

Automatic loading machinery for stations 11A, 11B and 11F is not illustrated in FIG. 11, but manual supply bins are shown at these work stations: bin 67 holds rolling bearings requiring seals to be installed; bin 68 holds a supply of seals #1 to be loaded and crimped at the next succeeding work station 11C and bin 69 holds a supply of seals designated "seals #2" to be loaded on bearings after they are inverted and reloaded by the turnover station mechanism at station 11E.

The operations performed on bearings and their ring seals on the worktable 60 shown in FIG. 11 are listed for six successive indexed positions of worktable 60 on annexed Table I. In this table the fixed operations or devices at each of the work stations 11A through 11F are indicated at the top of the six columns in the table. The six work jigs 61–66, arrayed counterclockwise around the worktable and indexed clockwise through 60 degree increments upon every indexing of worktable 60, are shown in their new indexed position in each transverse row in Table I.

TABLE I

| Operations Performed at Automated Production Station Illustrated in FIG. 11 | | | | | |
|---|---|---|---|---|---|
| 11A | 11B | 11C | 11D | 11E | 11F |
| | | Fixed Operations or Devices | | | |
| Load Rolling Bearing | Load Ring Seal #1 | Crimp | Eject | Pick Up; Invert; Reload Inverted | Load Ring Seal #2 |
| 61 Bearing | 66 — | 65 Crimp | 64 Eject | 63 Invert | 62 #2 |
| 62 — | 61 #1 | 66 Crimp | 65 — | 64 Reload from 63 | 63 — |
| 63 Bearing | 62 — | 61 Crimp | 66 Eject | 65 Invert | 64 #2 |
| 64 — | 63 #1 | 62 Crimp | 61 — | 66 Reload from 65 | 65 — |
| 65 Bearing | 64 — | 63 Crimp | 62 Eject | 61 Invert | 66 #2 |
| 66 — | 65 #1 | 64 Crimp | 63 — | 62 Reload from 61 | 61 — |

Thus in the first row, work jig 61 appears at station 11A as shown in FIG. 11. No operation is performed on work jig 66 at work station 11B in this position of worktable 60. The bearing with its new ring seal in place in work jig 65 is being crimped by the crimp tooling of the present invention mounted on the press at work station 11C in FIG. 11.

At the same time, work jig 64 is being unloaded of its completed rolling bearing, with both seals previously crimped in position on both ends of the bearing, by the eject mechanism at eject station 11D.

Work station 63 contains a bearing whose first ring seal has been crimped in place and the turnover mechanism is siezing, withdrawing and inverting this bearing at this stage of the progress of worktable 60. Work jig 62 contains a bearing facing upward requiring the installation of a new ring seal #2 which is being loaded thereon at station 11F.

All of these simultaneous operations having been completed, worktable 60 then indexes 60 degrees clockwise, and the second transverse row of entries on Table I describes the operations occurring at this indexed position of worktable 60. Work jig 62, which has just received its new ring seal on the unsealed face of the rolling bearing, requires no operation, at station 11A, but the new bearing previously loaded into work jig 61 is now at work station 11B where it receives the loading of ring seal #1.

By tracing the progress of work jig 61 downward diagonally from left to right, one index position to the right for each indexed transverse row in Table I, the successive operations performed on work pieces in work jig 61 may easily be traced. In the third row, the rolling bearing in work jig 61 with its new ring seal #1 in place is crimped at 11C. In the fourth row work jig 61 remains in position at work station 11D, requiring no operation performed on it.

In the fifth row, work jig 61 is presented to the turnover mechanism at work station 11E where the bearing with seal #1 crimped in place is seized, withdrawn and inverted, leaving work jig 61 empty. The inverted bearing just removed from this work jig 61 at work station 11E in this fifth row position is reloaded into work jig 62 in the sixth row indexed position of worktable 60.

Repeating the cycle of worktable 60, the next indexed position is shown in transverse row 1, and the empty work jig 61, unloaded by the turnover mechanism in the fourth row position, is now presented and receives its new rolling bearing at loading station 11A. The inverted and reloaded bearing in work jig 62 has now progressed to station 11F, where it receives a new ring seal #2 on its exposed face, as shown at the right-hand end of transverse row 1.

In the second row, when work jig 62 reaches station 11A, no action is required and, progressing diagonally downward to the right, the same is true in the third row where the inverted and reloaded bearing with its ring seal #2 in place in work jig 62 again requires no action. In the fourth row, the ring seal #2 is crimped in position on the rolling bearing in work jig 62.

In the fifth row, work jig 62 reaches the eject station 11D, and the completed rolling bearing with both ring seals crimped in place is withdrawn and ejected from work table 60 and delivered to stock. In the sixth row, work jig 62 is ready to receive an inverted bearing with only one ring seal #1 crimped in place previously removed from work jig 61 by the turnover mechanism at station 11E.

Thus in two complete revolutions of work table 60 the rolling bearing initially loaded in work jig 61 has received both ring seals crimped in place automatically, first in work jig 61 and then in work jig 62, and has been ejected and delivered to stock.

An examination of Table I makes it evident that after a rolling bearing has had ring seal #1 crimped in place in work jig 63 in row 5 of the Table, and has progressed through row 6 to row 1, the bearing is removed and inverted from work jig 63, which proceeds empty to row 2 of Table I while the same bearing is there reloaded in the next succeeding work jig 64. In the third row of the Table it receives a new ring seal #2, and then proceeds to the sixth row, where ring seal #2 is crimped. In the first row of the Table, this completed bearing is withdrawn from work jig 64 and ejected.

In a like manner, the rolling bearing loaded in work jig 65 at station 11A at the beginning of the fifth row of the table progresses through the same series of operations and is eventually ejected from work jig 66 in the third row of the table on its second revolution around worktable 60.

Table I clearly shows that the operation of the crimp tooling of the present invention is performed at every work jig in every indexed position of work table 60, whereas the loading of bearings and ring seals, the inverting, the reloading and the ejection are all performed at alternate indexed positions of work table 60. The loading of new bearings in work jigs 61, 63 and 65 occurs in rows one, three and five; the loading of seals #1 in rows two, four and six; ejection of completed bearings in rows one, three and five; and the alternating inverting and reloading at station 11E all typify alternating operations, performed on every other work jig after two 60 degree indexings of worktable 60. Both end faces of each rolling bearing thus have their ring seals crimped in position by a single crimping station during their progress twice around work table 60.

A more elaborate and fully automated production station incorporating a large carousel worktable 70 with sixteen work jigs 71-86 positioned around its periphery is illustrated in FIG. 12. The sixteen work jigs spaced at 22.5 degree intervals around the periphery of worktable 70 will serve to designate the various work stations around the periphery of the worktable where fixed automatic devices perform all of the various operations required.

Dealing successively with work jigs 71-86, the work jig 71 at the front of worktable 70 is open in FIG. 12 and is not required for any active operation. Work jig 72 is presented for automatic loading of unsealed rolling bearings delivered along a conveyor 88 to a bearing loader slide 89 powered by a pneumatic cylinder 91. Work jig 73 faces a detector 92 to verify the presence of the new unsealed rolling bearing loaded by slide 89 and now carried in work jig 73.

Work jig 74 presents the unsealed rolling bearing for the loading of seal #1 fed from a vibratory bowl 93 to a vibratory track 94 to an escapement device 96 delivering a single seal #1 placed down in position on the rolling bearing by a pick and place unit 97. Work jig 75 faces another detector 98 confirming the presence of seal #1 by detecting the difference in reflectivity with an electric eye. In the absence of seal #1, the crimp tooling 10 at work jig 76 is deactivated when work jig 75 comes into position for crimping. If the detector 98 confirms the presence of seal #1, then the crimping operation is performed when the bearing arrives at the position of work jig 76 under the crimp tooling 10. Work jig 77 is open and no operation is performed at that station. Work jig 78 is presented to the turnover mechanism where the bearing with seal #1 crimped in position is raked from the nest or work jig 78 by a turnover arm 99 mounted on an air cylinder 101, and then placed in a turnover nest, with an air operated rotary actuator inverting the rolling bearing 180 degrees, exposing its unsealed face, and it is then redelivered to the same nest or work jig 76.

Work jig 79 is presented for loading of seal #2 by seal loader 102, similar to the assembly 93-97, and work jig 80 cooperates with detector 103 to confirm the presence of seal #2 in position, ready for crimping. Crimping is performed at work jig 81 by the same crimp tooling 10 disclosed in detail hereinabove.

Work jig 82 is open and work jig 83 is the eject station where finished bearings with both seals #1 and #2 crimped in place are removed, by raking them from the nest with an air cylinder operated arm 104 and delivering them to a chute directing them to stock. Any work jigs carrying bearings which have been identified, at detector stations by detectors 98 or 103, as having missing seal rings are bypassed by eject slide 104 at work jig 83. These defective assemblies proceed to work jig 84 where the rejecting eject mechanism 105 ejects them for reworking or scrap. Work jig 85 is presented to detector 106, to confirm that the jig or nest is empty as it proceeds toward the loading station for the next cycle of operation. Work jig 86 is open.

The presence of a bearing at station 85 observed by detector 106 actuates a shutdown of the automatic production system until the unwanted bearing is removed by an operator.

If the withdrawal, inverting and reloading of bearings with seal #1 crimped thereon is performed by the turnover mechanism 99-101 during a single indexed positioning of worktable 70, exposing work jig 78 to the turnover mechanism, then the inverted bearing is reloaded in the same work jig 78. This high speed turnover operation permits the use of every work jig during a single revolution of worktable 70, and significantly increases the production rate of sealed bearings produced by the system.

If the turnover mechanism 99-101 requires more time for inverting and reloading the bearing then a single indexed time increment of worktable 70 permits, then the inverted bearing is loaded into the next succeeding work jig, which must necessarily be empty in order to receive it. This requires that only alternate work jigs be loaded with new unsealed bearings at the loading station corresponding to work jig 72 in FIG. 12 so that alternate work jigs 73, 75 and 77 are empty as worktable 70 revolves to its indexed positions, permitting work jig 77 to receive the inverted bearing from work jig 78 when work jig 77 reaches the turnover device 99-101. This alternate loading of new unsealed bearings in work jigs is employed in the semiautomatic production apparatus shown in FIG. 11, where it is required because only a single stamping press is employed for crimping operations, and each bearing must necessarily make two circuits of the worktable 60 shown in FIG. 11 in order to crimp both seals #1 and #2 in place.

Since two crimping stations are employed in FIG. 12, every work jig may be employed and the production rate significantly increased if turnover unit 99-101 operates fast enough to invert and reload each bearing in the same work jig from which it is withdrawn by the turnover unit.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A stamping press tooling assembly for delivering parallel forces to a plurality of points angularly spaced around a ring-shaped workpiece, comprising a housing removably mountable on the ram of a stamping press and having a bottom plate with a central aperture therein, means forming a hollow lever chamber in said housing, overlying and communicating with said central bottom plate aperture, said aperture having an upper portion of larger inside diameter and a lower portion of smaller inside diameter, with means forming a laterally extending shelf joining the aperture portions, a shouldered hub centered inside and spaced away from the inside diameter of said aperture, a plurality of substantially identical shouldered sector rams arrayed peripherally between said hub and said bottom plate, extending through and beyond the aperture, each with a radially extending shoulder overlying said shelf, said hub being provided with a radially extending shoulder flange overlying the inner upper portion of all of said sector rams, a corresponding plurality of radially extending levers angularly arrayed in the lever chamber, each having an inner end riding on the outer upper portion of one sector ram and an outer end resting on said bottom plate, means forming a corresponding plurality of hydraulic pressure cylinders in said housing each having an axis intersecting a central upper portion of one said lever, a plurality of pistons each slidably mounted in one said cylinder and having a lower end abutting said lever, said sector rams and said pistons being reciprocable relative to said housing between upper and lower positions, and hydraulic pressure conduit means formed in said housing delivering pressurized hydraulic fluid to said cylinders above said pistons upon command, and disconnecting the same, whereby a ring-shaped workpiece positioned beneath said hub receives independent and substantially equal force at the same plurality of angularly spaced points, providing custom stamping deformation of the workpiece in a uniform manner.

2. The tooling assembly defined in claim 1 wherein the adjacent sector rams and their associated adjacent levers are maintained in alignment by a corresponding plurality of upstanding guide pins each riding in facing recesses formed in facing surfaces of each adjacent pair of sector rams.

3. The tooling assembly defined in claim 1 wherein the upper surface of each lever is crowned under its respective piston, positioning the lever arm of the line of action of the force supplied by the piston at a predetermined difference from the outer end of the lever, about which the lever is free to pivot in said lever chamber.

4. The tooling assembly defined in claim 1 wherein the central hub incorporates a downwardly protruding pilot beneath its lower end.

5. The tooling assembly defined in claim 4, further including a central plunger core slidably mounted in the housing for reciprocating movement between a retracted position with the hub telescoped upward into the lever chamber, and an extended position with the hub extending downward beyond the sector rams, and a stripping ejector spring compressible between the housing and the hub by the retracted position of the hub, and resiliently urging the hub downward to its extended position beyond the sector rams when the stamping press raises the tooling assembly from the workpiece.

6. The tooling assembly defined in claim 1, including means forming guide protrusions extending radially inward from said housing into the lever chamber between the outer ends of adjacent pairs of said levers, providing sliding guide surfaces positioning the levers in their radially arrayed, spaced positions.

7. The tooling assembly defined in claim 1 wherein the hub's radius exceeds the radial length of each lever between its inner end and its outer end.

8. The tooling assembly defined in claim 1 wherein the radial length of each lever between its inner end and its outer end exceeds five times the hub's radius.

* * * * *